(12) United States Patent
Chu et al.

(10) Patent No.: US 8,160,553 B2
(45) Date of Patent: Apr. 17, 2012

(54) METHOD AND DEVICE FOR MANAGING DATA IN MOBILE TERMINAL

(75) Inventors: Se-Youp Chu, Gumi-si (KR); Chang Taek Kang, Gumi-si (KR)

(73) Assignee: Samsung Electronics Co., Ltd (KR)

( * ) Notice: Subject to any disclaimer, the term of this patent is extended or adjusted under 35 U.S.C. 154(b) by 864 days.

(21) Appl. No.: 11/788,373

(22) Filed: Apr. 19, 2007

(65) Prior Publication Data

US 2007/0254723 A1    Nov. 1, 2007

(30) Foreign Application Priority Data

Apr. 19, 2006   (KR) .................. 10-2006-0035427

(51) Int. Cl.
   *H04M 3/42* (2006.01)
(52) U.S. Cl. .................. 455/414.1; 455/414.2; 455/418; 455/550.1; 455/566
(58) Field of Classification Search ............... 455/456.1, 455/456.3, 453.3, 566, 406, 405, 408, 414.1, 455/414.2, 418, 550.1
   See application file for complete search history.

(56) References Cited

U.S. PATENT DOCUMENTS

| | | | |
|---|---|---|---|
| 6,525,768 B2 * | 2/2003 | Obradovich | 348/231.99 |
| 2003/0032404 A1 * | 2/2003 | Wager et al. | 455/406 |
| 2005/0261003 A1 | 11/2005 | Fiedler et al. | |

FOREIGN PATENT DOCUMENTS

| | | |
|---|---|---|
| GB | 2 389 017 | 11/2003 |
| WO | WO 2004/057892 | 7/2004 |
| WO | WO 2005/033828 | 4/2005 |

* cited by examiner

*Primary Examiner* — Kamran Afshar
*Assistant Examiner* — Manpreet Matharu
(74) *Attorney, Agent, or Firm* — The Farrell Law Firm, P.C.

(57) ABSTRACT

Disclosed is a method for managing data in a mobile terminal, which includes storing data generated in the mobile terminal in a data log corresponding to the area in which the data was generated, among a plurality of data logs classified according to areas; and displaying data stored in each data log classified according to the areas.

15 Claims, 5 Drawing Sheets

| AREA INFORMATION | |
|---|---|
| NAME OF AREA | AREA CODE |
| Austria | 43 |
| Belgium | 32 |
| Finland | 358 |
| France | 33 |
| Greece | 30 |
| Hungary | 36 |
| Italy | 39 |
| Netherland | 31 |
| Poland | 48 |
| Spain | 34 |
| U.K | 44 |

(a)

(b)

(c)

(d)

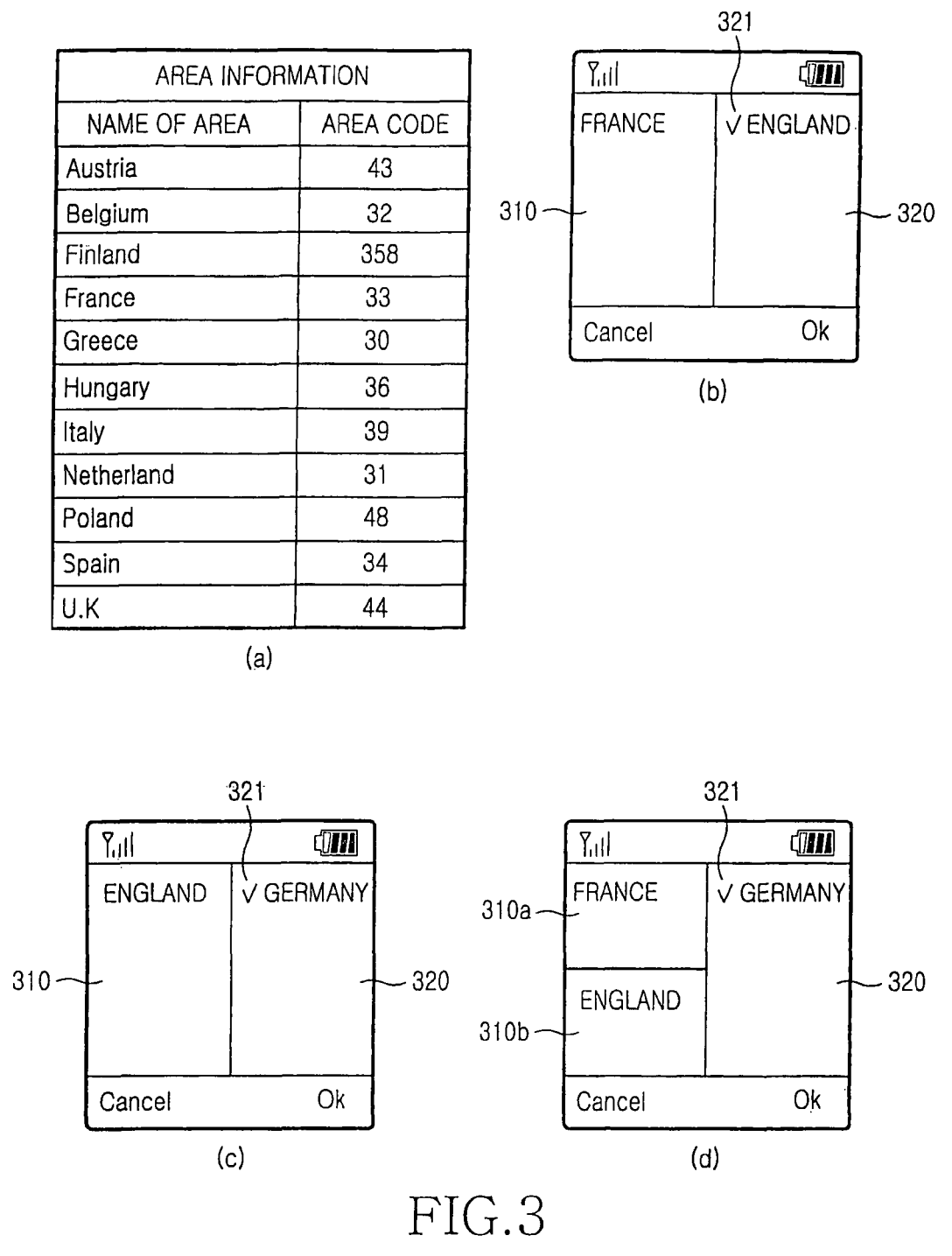

| AREA INFORMATION | |
| --- | --- |
| NAME OF AREA | AREA CODE |
| Austria | 43 |
| Belgium | 32 |
| Finland | 358 |
| France | 33 |
| Greece | 30 |
| Hungary | 36 |
| Italy | 39 |
| Netherland | 31 |
| Poland | 48 |
| Spain | 34 |
| U.K | 44 |

(a)

(b) FRANCE | √ ENGLAND — Cancel / Ok (c) ENGLAND | √ GERMANY — Cancel / Ok (d) FRANCE / ENGLAND | √ GERMANY — Cancel / Ok

FIG.3

| FRANCE DATA LOG | |
|---|---|
| Call | RECEIVED ~510 |
| | SENT |
| msg | RECEIVED |
| | SENT |
| ⋮ | ⋮ |
| OK | CANCEL |

(a)

| INCOMING CALL LOG IN FRANCE | |
|---|---|
| David | 06.03.24 10:20 a.m ~520a |
| Tim | 06.03.24 10:25 a.m ~520b |
| ⋮ | ⋮ |
| OK | CANCEL |

(b)

| INCOMING CALL LOG IN FRANCE | GERMANY ~531 |
|---|---|
| David | 06.03.24 11:20 a.m ~530a |
| Tim | 06.03.24 11:25 a.m ~530b |
| ⋮ | ⋮ |
| OK | CANCEL |

(c)

| INCOMING CALL LOG IN FRANCE | ENGLAND ~541 |
|---|---|
| David | 06.03.24 09:20 a.m ~540a |
| Tim | 06.03.24 09:25 a.m ~540b |
| ⋮ | ⋮ |
| OK | CANCEL |

METHOD AND DEVICE FOR MANAGING DATA IN MOBILE TERMINAL

PRIORITY

This application claims priority to an application entitled "Method and Device for Managing Data in Mobile Terminal" filed with the Korean Intellectual Property Office on Apr. 19, 2006 and assigned Serial No. 2006-35427, the entire disclosure of which is hereby incorporated by reference.

BACKGROUND OF THE INVENTION

1. Field of the Invention

The present invention relates to a method and a device for managing data in a mobile terminal, to enhance the ease of data management.

2. Description of the Related Art

Generally, "mobile terminals" refer to handheld devices used for voice communication and data transmission. Mobile terminals have been widely supplied due to their improved portability and have become a modern necessity. Mobile terminals offering a communication function, even outside a geographical coverage area, have attained popularity among businesspeople or travelers who make frequent trips abroad. Telecommunication service providers offer roaming services which enable mobile phone users to make or receive voice calls, send or receive data, or access other services when traveling outside the geographical coverage area of a home network. However, users who have used international roaming services in many countries may have difficulty at a later time in confirming which communication data was generated in each visited country. Therefore, an improved data management function is required to solve such a problem in data management and to thereby enhance the user's convenience.

SUMMARY OF THE INVENTION

Accordingly, the present invention has been made to solve at least the above-mentioned problems occurring in the prior art, and it is an aspect of the present invention is to provide a method and a device for managing data generated in a mobile terminal according to the area in which the data was generated.

In accordance with one aspect of the present invention, there is provided a method for managing data in a mobile terminal, which includes storing data generated in the mobile terminal in a data log corresponding to the area in which the data was generated, among data logs classified according to areas; and displaying data stored in each data log classified according to areas.

In accordance with another aspect of the present invention, there is provided a device for managing data in a mobile terminal, which includes a memory for storing at least one data log classified according to areas; and a control unit for storing data generated in the mobile terminal in a data log corresponding to the area in which the data was generated, and displaying data stored in each data log classified according to areas.

In accordance with another aspect of the present invention, there is provided a method for managing data in a mobile terminal, which comprises confirming currently visited area by receiving area information of currently visited area from servers; and displaying the currently visited area in a display screen.

In accordance with another aspect of the present invention, there is provided a device for managing data in a mobile terminal, which comprises A control unit for confirming currently visited area by receiving area information of currently visited area from servers, controlling to display the currently visited area; and a display unit for displaying the currently visited area.

BRIEF DESCRIPTION OF THE DRAWINGS

The above and other objects, features and advantages of the present invention will be more apparent from the following detailed description taken in conjunction with the accompanying drawings, in which:

FIG. 3 is a diagram illustrating a display screen divided for data management according to areas in accordance with the present invention;

FIG. 5 is a diagram illustrating the display of data generated in a specific area in accordance with the present invention.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein will be omitted when it may make the subject matter of the present invention unclear.

The term "data" used herein refers to communication data transmitted from or received by a mobile terminal, as well as image data stored in the mobile terminal. The communication data includes incoming/outgoing calls and messages (for example, Short Message Service (SMS), Enhanced Message Service (EMS) and Multimedia Message Service (MMS)). The image data can be a still picture, such as a photograph, and a motion picture, such as Video On Demand (VOD).

Figure 1:
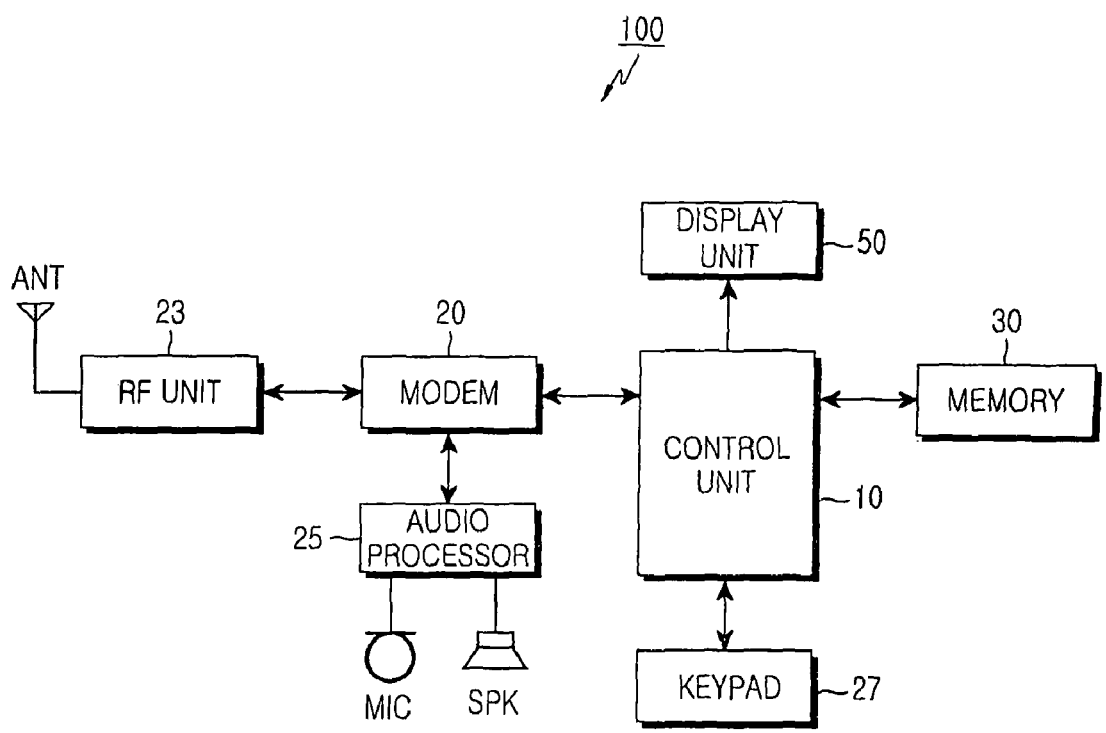
FIG. 1 is a block diagram of a mobile terminal in accordance with the present invention.

FIG. 1 is a block diagram of a mobile terminal according to the present invention.

Referring to FIG. 1, a Radio Frequency (RF) unit 23 comprises an RF transmitter for performing upward conversion and amplification of the frequency of a transmitted signal and an RF receiver for amplifying a received signal with low noise and performing downward conversion of the frequency of the signal. The RF unit 23 receives area information on the area in which the mobile terminal is currently located. The area information can be a network code or a country code assigned to each country. The area information may or may not include the local time of the current location area, which reflects the time difference from GMT (Greenwich Mean Time). The area information can be obtained from LAI (Location Area Identifier) or NITZ (Network Identity and Time Zone) received from a mobile communication network. A modem 20 comprises a transmitter for coding and modulating a signal which is transmitted and a receiver for demodulating and decoding a signal received from the RF unit 23.

An audio processor 25 may include a codec consisting of a data codec for processing packet data and an audio codec for processing an audio signal such as a speech signal. The audio processor 25 converts a digital audio signal received by the modem 20 into an analog signal and reproduces the analog signal through the audio codec. Also, the audio processor 25 converts an analog audio signal generated from a microphone into a digital audio signal through the audio codec and transfers the digital audio signal to the modem 20. The codec can be provided as an independent element or included in a control unit 10.

A keypad 27 is provided with alphanumeric keys for inputting characters or numbers and function keys for setting various functions.

A memory 30 may be composed of a program memory and a data memory. The program memory stores programs for controlling general operations of the mobile terminal 100. The memory 30 includes a plurality of data logs designated for different areas to store data generated in the respective areas. Also, the memory 20 may store a GMT time difference table showing the time difference between GMT and a local time in each country of the world.

A display unit 50 may be implemented by an LCD (Liquid Crystal Display) or OLED (Organic Light Emitting Diodes). The display unit 50 displays various data generated in the mobile terminal 100. When the LCD is a touch screen, the LCD can serve as an input unit together with the keypad 27. In a preferred embodiment of the present invention, the display unit 50 displays data generated areas on a screen divided according to preset display settings.

The control unit 10 controls the overall operations and operation modes of the mobile terminal 100 according to a key input signal provided by the keypad 27. When any data is generated in the mobile terminal 100, the control unit 10 confirms area information on the data generated area and stores the data in a data log corresponding to the data generated area. The control unit 10 divides the screen of the display unit 50 into two or more sections according to preset display settings and displays respective data generated areas in the corresponding sections of the divided screen. When the user selects one of the data generated areas, the control unit 10 then displays data (or events) generated in the selected area. The data generated areas displayed on the divided screen of the display unit 50 can be at least one area visited most recently by the user or at least one area designated by the user to be displayed.

Hereinafter, a method and a device for managing data generated in the mobile terminal 100 will be explained in detail with reference to the accompanying drawings.

Figure 2:
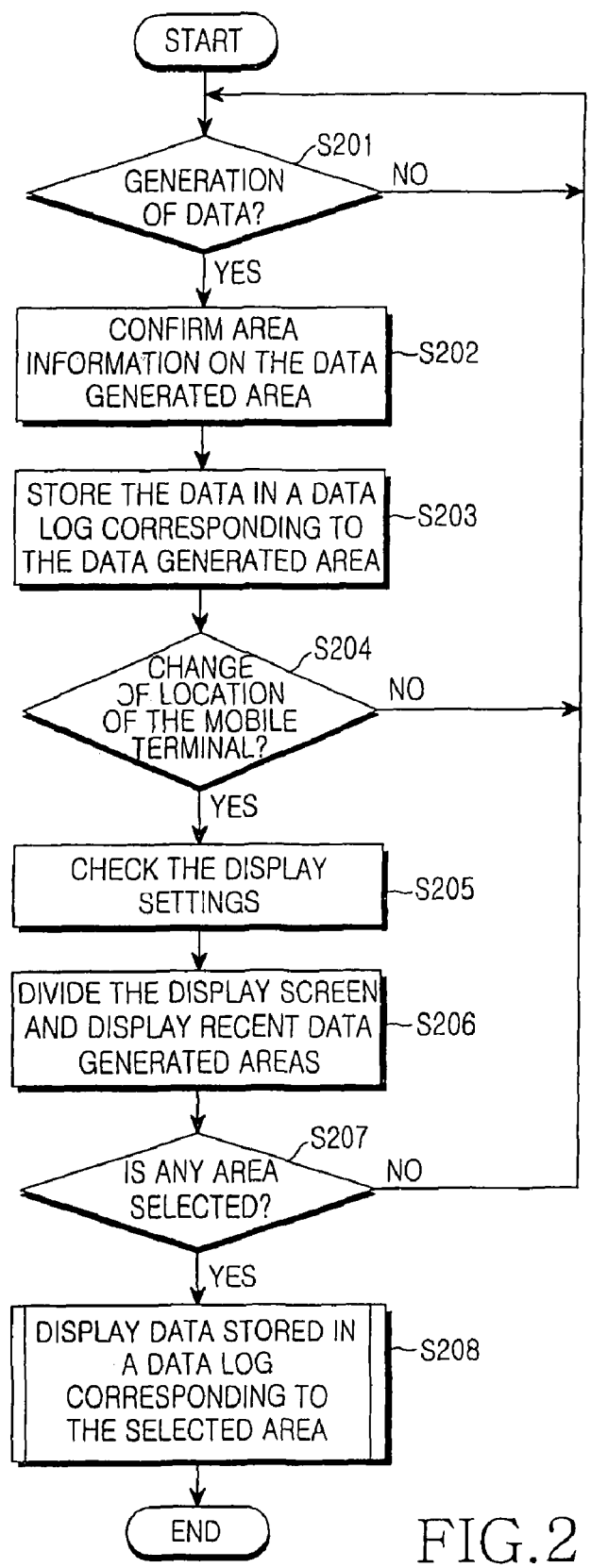
FIG. 2 is a flowchart showing a process of managing data according to areas in accordance with the present invention.

FIG. 2 is a flowchart showing a process of managing data according to areas in accordance with a preferred embodiment of the present invention. FIG. 3 is a diagram illustrating a display screen divided for data management according to areas in accordance with a preferred embodiment of the present invention.

Referring to FIGS. 2 and 3, when any data is generated in the mobile terminal 100 in step S201, the control unit 10 detects area information on the data generated area in step S202. The area information can be a country code or a state code according to the location of the mobile terminal 100. For example, if the mobile terminal 100 is currently located in a European country using a GSM communication system, the control unit 10 will receive an LAI containing a country code as illustrated in diagram (a) of FIG. 3 and obtain the area information from the LAI.

After confirming the data generated area in step S202, the control unit 10 stores the data generated in step S201 in a data log corresponding to the data generated area in step S203. Data logs are separately designated for the respective areas. Each data log stores data generated in a specific area, and may also store the time when each data was generated. If the data log corresponding to the data generated area is not present in the memory 30, the control unit 10 will create a new data log in the memory 30. The control unit 10 may store the generated data itself or only store a link to the generated data in the corresponding data log.

If the control unit 10 detects a change in the area information during the implementation of steps S201 to S203, the control unit will recognize that the mobile terminal 100 has moved to a new location in step S204, and will check the preset display settings for the display unit 50 in step S205. For example, if the user moves to England from France, the control unit 10 will receive a country code "44" as illustrated in diagram (a) of FIG. 3 and thereby detect that the location of the mobile terminal 100 has changed to England from France. The display settings in step S205 include settings of the display screen division and graphical settings of the display screen.

The control unit 10 divides the display screen into two or more sections according to the display settings checked in step S205, and displays recent data generated areas on the corresponding sections of the divided screen in step S206. Supposing that the display screen is to be divided into two sections according to the display settings and that the location of the mobile terminal 100 has changed to England from France, the control unit 10 will divide the display screen into two sections and display two data generated areas, i.e. France and England, on the two sections 310 and 320 as illustrated in diagram (b) of FIG. 3. At this time, the control unit 10 displays the two most recently visited areas, France and England, on the two sections 310 and 320. Alternatively, the control unit 10 may allow the user to select two areas and display the selected areas on the divided screen. Also, the control unit 10 may use a graphical effect, such as a marking 321 shown in diagram (b) of FIG. 3, to indicate that the mobile terminal 100 is currently located in England.

Supposing that the current location of the mobile terminal 100 has changed to Germany from England, the control unit 10 will display data generated areas as illustrated in diagram (c) or (d) of FIG. 3. More specifically, if the display screen is to be divided into two according to the display settings, the control unit 10 will divide the display screen into two sections and display the two recently visited areas, England and Germany, on the two sections 310 and 320 as illustrated in diagram (c) of FIG. 3. If the display screen is to be divided into three according to the display settings, the control unit 10 will then divide the display screen into three sections and display the three recently visited areas, i.e. France, England and Germany, on the three sections 310*a*, 310*b* and 320 as illustrated in diagram (d) of FIG. 3. At this time, the control unit 10 may display a country/state name, a local time and/or a flag (in the case of a country) in each section (310, 310*a*, 310*b* and 320 in diagrams (b) to 3(*d*) of FIG. 3) of the divided screen.

Also, the control unit 10 may additionally display useful information about the areas.

During the display of the data generated areas in step S206, the user can select one area to check data generated in that area in step S207. Then, the control unit 10 displays the data stored in a data log corresponding to the selected area in step S208. This Step S208 will be explained in more detail with reference to FIGS. 4 and 5.

Figure 4:
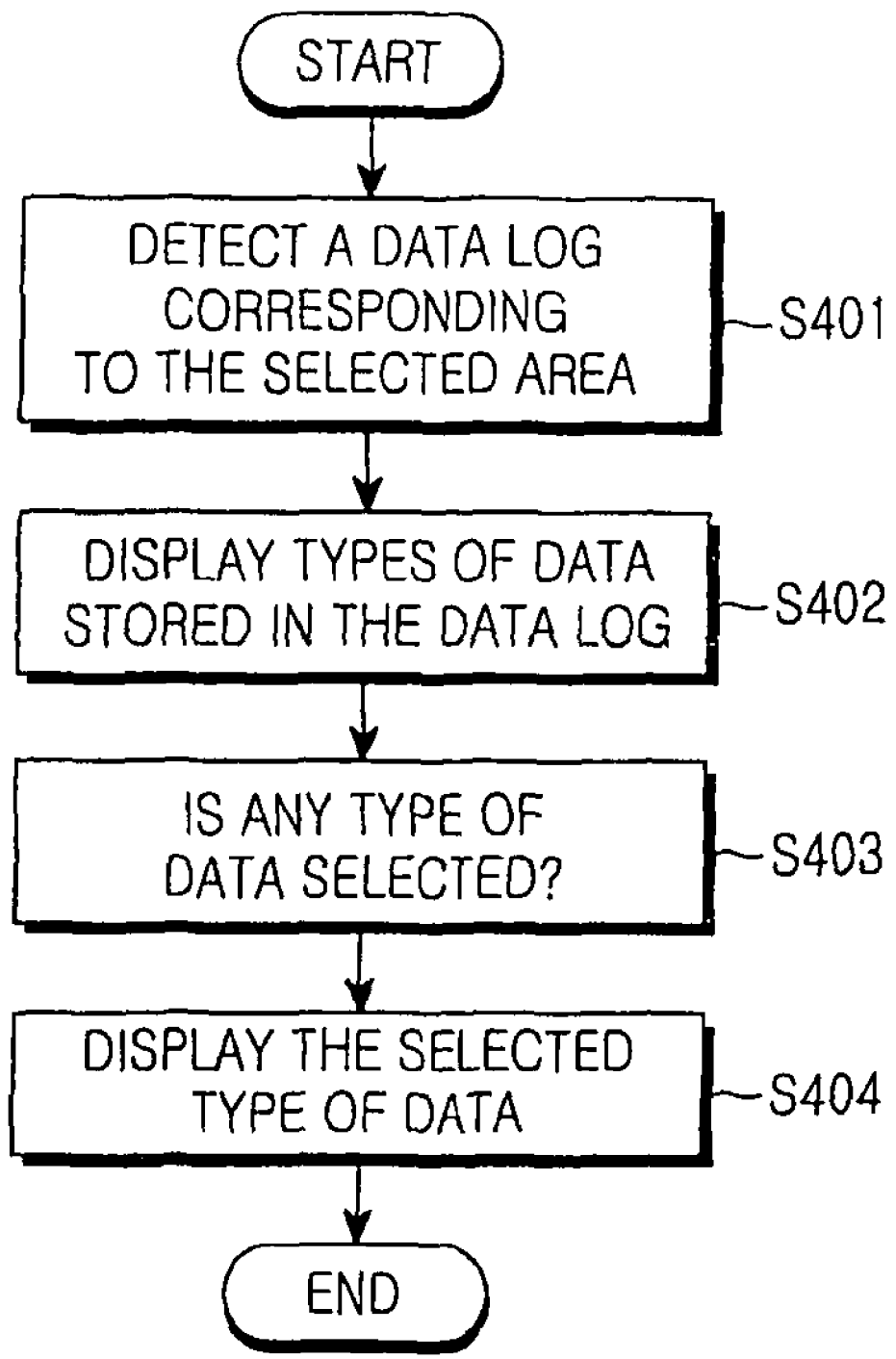
FIG. 4 is a flowchart showing a process of displaying data generated in a specific area in accordance with the present invention.

FIG. 4 is a flowchart showing a process of displaying data generated in a specific area according to a preferred embodiment of the present invention. FIG. 5 is a diagram illustrating the display of data generated in a specific area according to a preferred embodiment of the present invention.

If the user selects France during the display of the data generated areas in diagram (d) of FIG. 3, the control unit 10 will detect a France data log in step S401 and confirm types of data stored in the detected data log in step S402. The control unit 10 will then display the types of data generated in France as illustrated in diagram (a) of FIG. 5. The types of data may include incoming/outgoing calls, messages and other data (for example, mobile phone use times in the selected area).

When the user selects one of the displayed types of data in step S403, the control unit 10 displays the selected type of data in step S404. For example, when the user selects "incoming calls" as illustrated in diagram (a) of FIG. 5, the control unit 10 displays a list of incoming calls received in France as illustrated in diagram (b) of FIG. 5. If a type of data separately designated by the user is generated, the control unit 10 will store and display the data with the name of the area in which the data was generated.

As illustrated in diagram (b) of FIG. 5, each data 520a, 520b generated in France is displayed with a local time of data generation in France. The data generation time in France can be converted to a local time in any other area when the user selects an area 531 or 541 displayed in diagram (c) or (d) of FIG. 5. In other words, the data generation time 520a in France as illustrated in diagram (b) of FIG. 5 can be converted to a corresponding local time 530a in Germany as illustrated in diagram (c) of FIG. 5 or a corresponding local time 540a in England as illustrated in diagram (d) of FIG. 5.

As explained above, the mobile terminal displays two or more data generated areas on the divided display screen. When the user selects an area, the mobile terminal displays every data generated in the selected area. The mobile terminal can be set to immediately display a data log corresponding to a data generated area on the divided screen upon generation of data, which enables the user to immediately confirm the generation of data and thereby enhances the user's convenience in data management.

The present invention provides a method for effectively managing data generated when the location of a mobile terminal has changed to an area having a time difference from a previous location area. All of the data is managed according to the data generated areas.

According to the present invention, the mobile terminal displays data generated areas (or recently visited areas). The user can confirm data which has been generated in a specific area simply by selecting the area from the displayed areas.

Although preferred embodiments of the present invention have been described for illustrative purposes, those skilled in the art will appreciate that various modifications, additions and substitutions are possible, without departing from the scope and spirit of the invention as disclosed in the accompanying claims, including the full scope of equivalents thereof.

What is claimed is:

1. A method for managing data in a mobile terminal, comprising the steps of:
   generating data in the mobile terminal;
   determining a geographic area of the mobile terminal corresponding to a time at which the data is generated;
   determining, from among a plurality of data logs stored in the mobile terminal and classified according to respective geographic areas, a data log corresponding to the determined geographic area;
   storing the generated data in the determined data log corresponding to the determined geographic area;
   dividing a display screen of the mobile terminal into at least two sections corresponding to respective geographic areas of data logs from among the plurality of data logs stored in the mobile communication terminal; and
   when a geographic area corresponding to one of the at least two sections is selected, displaying data stored in the data log corresponding to the selected geographic area in the selected section.

2. The method according to claim 1, wherein the generated data includes communication data sent from or received by the mobile terminal.

3. The method according to claim 1, wherein determining a data log corresponding to the determined geographic area includes generating a new data log corresponding to the determined geographic area when a data log corresponding to the data generated area is not already present among the plurality of data logs stored in the mobile terminal, and storing the newly generated data log in the mobile terminal as the data log corresponding to the determined geographic area.

4. The method according to claim 1, wherein the generated data is stored in the determined data log, together with information indicating the time at which the data is generated.

5. The method according to claim 1, wherein the geographic area is determined according to information received from a server located within the determined geographic area.

6. The method according to claim 1, wherein each of the at least two sections includes at least one of an area name, a local time, and a flag representing the geographic areas corresponding to each section.

7. The method according to claim 1, wherein the geographic areas corresponding to each of the at least to sections is a recently visited geographic area or geographic areas corresponding to data that has already been generated by the mobile terminal.

8. A device for managing data in a mobile terminal, comprising:
   a memory for storing plurality of data logs classified according to geographic areas; and
   a control unit for generating data, determining a geographic area of the mobile terminal corresponding to a time at which the data is generated, determining, from among the plurality of data logs, a data log corresponding to the determined geographic area, and storing the generated data in the determined data log corresponding to the determined geographic area;
   a display unit divided into at least two sections according, where each section corresponds to a recently visited geographic area or geographic areas corresponding to data that has already been generated by the mobile terminal on the respective sections;
   wherein when one of the at least two sections is selected, and the control unit controls the display unit to display data stored in a data log corresponding to the geographic area corresponding to the selected section.

9. The device according to claim 8, wherein the display unit displays, within each section, at least one of an area name, a local time, and a flag according to the respective geographic area corresponding to each section.

10. The device according to claim 8, wherein when a data log corresponding to the determined geographic area is not detected in the memory, and the control unit generates a new data log corresponding to the determined geographic area, stores the newly generated data log in the memory, and stored the generated data in the newly generated data log.

11. The device according to claim 8, wherein the control unit determines the geographic area of the mobile terminal according information received from a server located within in the determined geographic area.

12. The device according to claim 8, wherein the generated data includes communication data sent from or received by the mobile terminal.

13. The device according to claim 8, wherein the generated data is stored in the determined data log, together with information indicating the time at which the data is generated.

14. The method according to claim 1, wherein the generated data includes image data stored in the mobile terminal.

15. The device according to claim 8, wherein the generated data includes image data stored in the mobile terminal.

* * * * *